(Model.)
R. WEBER.
FIFTH WHEEL.
No. 261,110. Patented July 11, 1882.
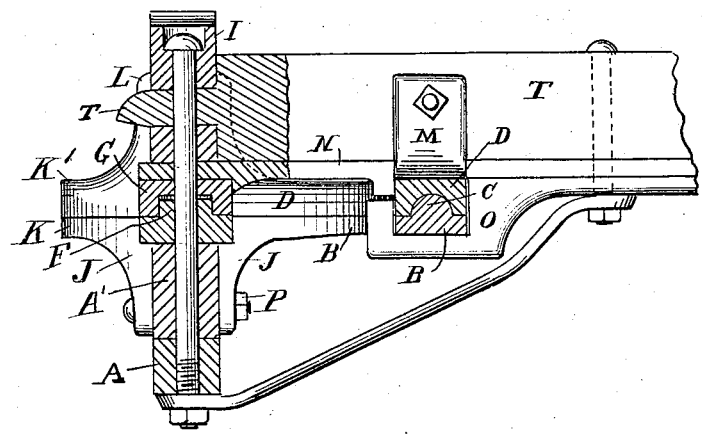
WITNESSES:
J. D. Garfield
C. Sedgwick
INVENTOR:
R. Weber
BY Munn & Co
ATTORNEYS.

(Model.)
R. WEBER.
FIFTH WHEEL.
No. 261,110. Patented July 11, 1882.
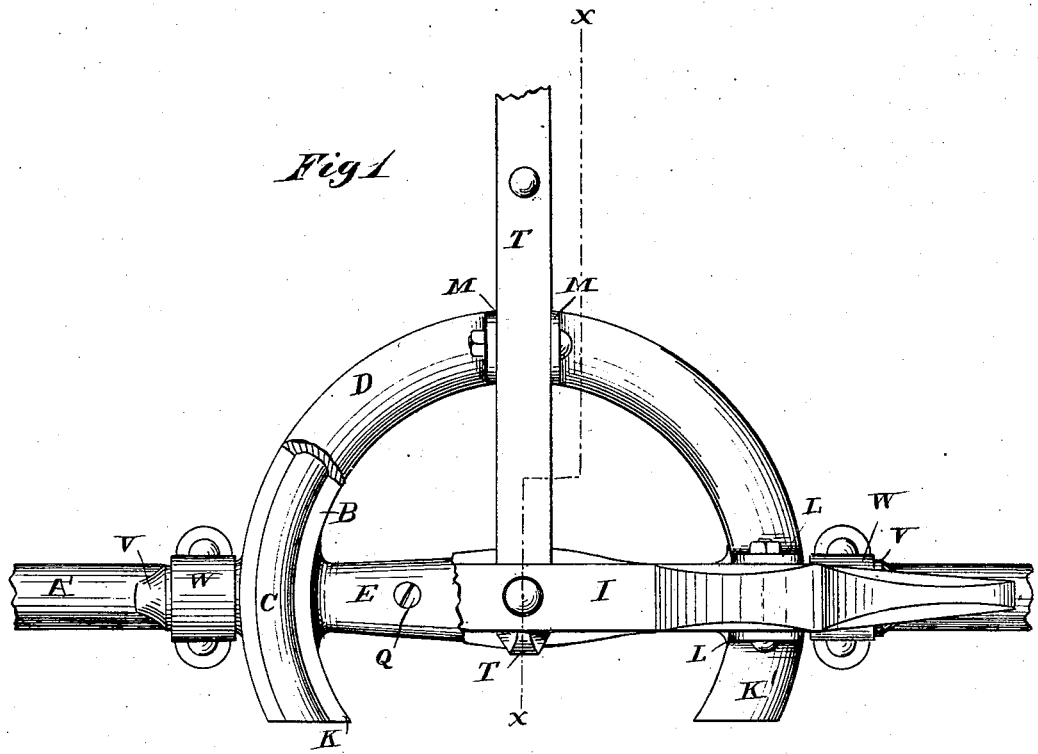
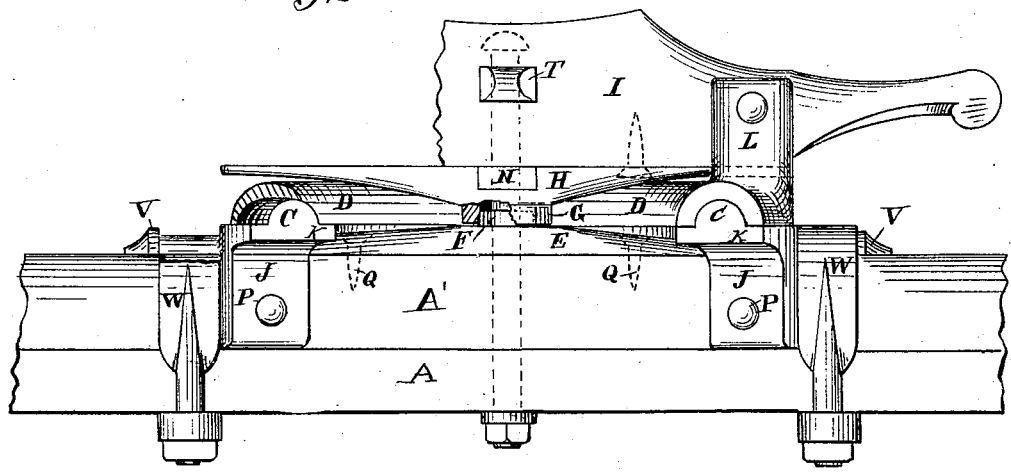
WITNESSES:
INVENTOR:
R. Weber
BY Munn & Co.
ATTORNEYS.

UNITED STATES PATENT OFFICE.

ROBERT WEBER, OF CORSICANA, TEXAS.

FIFTH-WHEEL.

SPECIFICATION forming part of Letters Patent No. 261,110, dated July 11, 1882.

Application filed April 21, 1882. (Model.)

*To all whom it may concern:*

Be it known that I, ROBERT WEBER, of Corsicana, in the county of Navarro and State of Texas, have invented a new and Improved Fifth-Wheel for Vehicles, of which the following is a full, clear, and exact description.

This invention consists of improvements in the construction and arrangement of the fifth-wheel apparatus of carriages, the object of which is to enable the parts to be made more cheaply, also to be more readily removable, and also to be more durable in use than as such apparatus is now made, as hereinafter described.

Reference is to be had to the accompanying drawings, forming part of this specification, in which similar letters of reference indicate corresponding parts in all the figures.

Figure 1 is a plan view of my improved fifth-wheel with some parts broken out. Fig. 2 is a front elevation with some parts broken out; and Fig. 3 is a sectional elevation, taken on line $x$ $x$ of Fig. 1.

A and A' represent the axle and cap, and B the main parts of the fifth-wheel. I propose to construct said fifth-wheel with the oval tongue C on the upper side for the cap D to fit on by a groove of corresponding shape in its under side, and I also make said fifth-wheel with a center plate, E, to bolt on the axle and having a shoulder, F, for the socket G of the bottom plate, H, of the bolster I, to fit on and take the strain off the king-bolt. Besides the center plate, E, I apply the clips J to the fifth-wheel for bolting to the sides of the axle; also, the extensions V, to be fastened by the clips W; and I also make the said fifth-wheel with the front projections, K, for greater stability with respect to the forward and backward pitch of the body of the carriage. I also make the cap D of the fifth-wheel with corresponding front extensions, K'; also, with clips L for attaching to the bolster, and clips M for attaching to the reach T.

Instead of attaching the cap D to the reach-iron N, I make it separate and connect it by the clips M, as stated, and apply the guard O, in which the wheel B is free to slide, but which keeps it in contact with the cap D. By this construction of cap D and reach-iron N separate the reach-iron can be made and handled more easily than with the cap attached. It will be seen that in case the axle is to be taken out for setting or for any other purpose it can be readily done by taking off clips W, and the cap D can be taken off by unscrewing its clips L and M; and it will also be seen that the construction is very substantial and calculated to be very durable.

The manner of attaching this fifth-wheel may be varied to adapt it to differently-constructed vehicles, and for adaptation to platform-wagons, &c., it can be made as an entire circle and the manner of attachment varied suitably for such wagons, &c., without departing from the main features of my invention.

Having thus fully described my invention, I claim as new and desire to secure by Letters Patent—

In a fifth-wheel, the lower segment, B, having an axle-plate, E, provided with two pairs of clip-posts, J, in combination with two bolts, P, for the purpose of securing said segment-plate to the wood portion of the axle independent of the iron portion, and further provided with two tangs, V, in combination with two clips, W, for the purpose of binding said segment-plate and both parts of the axle rigidly together, as shown and described.

ROBERT WEBER.

Witnesses:
JAMES LARMOUTH,
R. H. CUBBY.